US009623515B2

United States Patent
Breuer et al.

(10) Patent No.: US 9,623,515 B2
(45) Date of Patent: Apr. 18, 2017

(54) METHOD FOR LASER WELDING ONE OR MORE WORKPIECES OF HARDENABLE STEEL IN A BUTT JOINT

(71) Applicant: WISCO Tailored Blanks GmbH, Duisburg (DE)

(72) Inventors: Arndt Breuer, Duisburg (DE); Max Brandt, Duisburg (DE); Dietmar Schaftinger, Rheinberg (DE)

(73) Assignee: Wisco Tailored Blanks GmbH, Duisburg (DE)

( * ) Notice: Subject to any disclaimer, the term of this patent is extended or adjusted under 35 U.S.C. 154(b) by 148 days.

(21) Appl. No.: 14/443,441

(22) PCT Filed: Aug. 2, 2013

(86) PCT No.: PCT/EP2013/066274
§ 371 (c)(1),
(2) Date: May 18, 2015

(87) PCT Pub. No.: WO2014/075824
PCT Pub. Date: May 22, 2014

(65) Prior Publication Data
US 2015/0306702 A1      Oct. 29, 2015

(30) Foreign Application Priority Data
Nov. 19, 2012   (DE) .......................... 10 2012 111 118

(51) Int. Cl.
*B23K 26/21*   (2014.01)
*B23K 26/26*   (2014.01)
(Continued)

(52) U.S. Cl.
CPC ............. *B23K 26/26* (2013.01); *B23K 26/32* (2013.01); *B23K 26/322* (2013.01);
(Continued)

(58) Field of Classification Search
CPC ................................. B23K 26/21; B23K 26/40
(Continued)

(56) References Cited

U.S. PATENT DOCUMENTS 9,289,855 B2 *   3/2016   Evangelista ............ B32B 15/01
2005/0011868 A1   1/2005   Matile et al.
(Continued)

FOREIGN PATENT DOCUMENTS

CN   1217248 A   5/1999
CN   101104225 A   1/2008
(Continued)

OTHER PUBLICATIONS

Automobile—Catalogue 2000, Usinor Auto, 2000, pp. 63 and 95-98 (English-language statement of relevance).
(Continued)

*Primary Examiner* — Samuel M Heinrich
(74) *Attorney, Agent, or Firm* — The Webb Law Firm

(57) ABSTRACT

A method for laser welding of one or more workpieces made from press hardenable steel, in a butt joint, in which the workpiece or the workpieces have a thickness of at least 1.8 mm and/or a jump in thickness of at least 0.4 mm arises at the butt joint including supplying filler wire into a molten bath generated by a laser beam. In order to ensure that the weld seam can reliably harden into a martensitic structure during the hot forming (press hardening), the filler wire contains at least one alloy element from the group of manganese, chromium, molybdenum, silicon and nickel, wherein the at least one alloy element is present in the filler wire with a mass proportion that is larger by 0.1% by weight than the mass proportion of the element in the press hardenable steel of the workpiece or the workpieces.

9 Claims, 1 Drawing Sheet

(51) Int. Cl.

| | |
|---|---|
| *B23K 26/32* | (2014.01) |
| *B23K 26/322* | (2014.01) |
| *B23K 35/30* | (2006.01) |
| *C22C 38/00* | (2006.01) |
| *C22C 38/06* | (2006.01) |
| *C22C 38/08* | (2006.01) |
| *C22C 38/22* | (2006.01) |
| *C22C 38/28* | (2006.01) |
| *C22C 38/32* | (2006.01) |
| *C22C 38/38* | (2006.01) |
| *B23K 101/18* | (2006.01) |
| *B23K 101/34* | (2006.01) |
| *B23K 103/04* | (2006.01) |
| *B23K 103/00* | (2006.01) |

(52) U.S. Cl.
CPC ...... *B23K 26/3206* (2013.01); *B23K 35/3066* (2013.01); *C22C 38/002* (2013.01); *C22C 38/06* (2013.01); *C22C 38/08* (2013.01); *C22C 38/22* (2013.01); *C22C 38/28* (2013.01); *C22C 38/32* (2013.01); *C22C 38/38* (2013.01); *B23K 2201/18* (2013.01); *B23K 2201/34* (2013.01); *B23K 2203/04* (2013.01); *B23K 2203/50* (2015.10)

(58) Field of Classification Search
USPC .......... 219/121.63, 121.64, 121.85; 228/205, 228/262.41
See application file for complete search history.

(56) References Cited

U.S. PATENT DOCUMENTS

| | | | |
|---|---|---|---|
| 2008/0011720 A1 | 1/2008 | Briand et al. | |
| 2010/0086803 A1* | 4/2010 | Patberg ................. | B21C 37/08 428/595 |
| 2011/0226746 A1 | 9/2011 | Briand et al. | |
| 2013/0098878 A1 | 4/2013 | Briand et al. | |
| 2013/0105446 A1 | 5/2013 | Briand et al. | |
| 2013/0236239 A1 | 9/2013 | Brandt et al. | |
| 2013/0270233 A1 | 10/2013 | Gu et al. | |

FOREIGN PATENT DOCUMENTS

| | | |
|---|---|---|
| CN | 202038371 U | 11/2011 |
| DE | 102010019258 A1 | 11/2011 |
| WO | 2012007663 A1 | 1/2012 |
| WO | 2012007664 A1 | 1/2012 |
| WO | 2012079163 A1 | 6/2012 |

OTHER PUBLICATIONS

Boisselier, D. et al., "Le soudage par laser, Publication Air Liquide", Mar. 1998, pp. 36-37 (English-language statement of relevance).
Constant, A. et al., "Principes de base des traitements thermiques thermomecaniques et thermochimiques des aciers", 1992, pp. 8-9 and 12-13 (English-language statement of relevance).
Kaplan, D. et al., "Efficient welding with advanced steels and high-power energy beams", European Commission technical steel research, 2002, pp. 28 and 129-131.
"Metallurgie generale: Les aciers I—theorie", May 25, 2010, pp. 1-14 (English-language statement of relevance).
Murry, G., "Aciers pour traitements thermiques—Proprietes et guide de choix", Techniques de l'ingenieur, traite Materiaux metalliques, Mar. 10, 2002, pp. M 4 530-1-M 4 530 - 10 (English-language statement of relevance).
Phillips, R. H. et al., "Laser Beam Welding of HY80 and HY100 Steels Using Hot Welding Wire Addition", Welding Research Supplement, Jun. 1992, pp. 201-s-208-s.
Pic, A. et al., "Innovative hot-stamped laser welded blank solutions", stahl and eisen 128, 2008, pp. 59-66, Nr. 8 (English-language abstract).
Sharma, R. S. et al., "Weldability of advanced high strength steels using an Yb:YAG disk laser", Journal of Materials Processing Technology, 2011, pp. 1888-1897, vol. 211.
Sun, Z. et al., "Review—Laser welding of dissimilar metal combinations", Journal of Materials Processing Technology, 1995, pp. 4205-4214, No. 30.
Sun, Z. et al., "Bridging the joint gap with wire feed laser welding", Journal of Materials Processing Technology, 1999, pp. 213-222, No. 87.
Trzaska, J. et al., "The calculation of CCT diagrams for engineering steels", Archives of Materials Science and Engineering, Sep. 2009, pp. 13-20, vol. 39, Issue 1.
Tusek, J. et al., "Welding of tailored blanks of different materials", Journal of Materials Processing Technology, 2001, pp. 180-184, vol. 119.
Neissbach, W., Werkstoffkunde, 24, Nov. 2011, pp. 87 and 10 (English-language statement of relevance).
Neissbach, W., Werkstoffkunde, 24, Nov. 2011, p. 96 (English-language statement of relevance).
Welding Handbook, Consumables for manual and automatic welding, Eighth Edition, "Consumables for low-alloyed steels", ESAB AB, 2005, pp. 87, 122, and 153-154, Sweden, Eighth Edition.

* cited by examiner

METHOD FOR LASER WELDING ONE OR MORE WORKPIECES OF HARDENABLE STEEL IN A BUTT JOINT

CROSS-REFERENCE TO RELATED APPLICATIONS

This application is the United States national phase of International Application No. PCT/EP2013/066274 filed Aug. 2, 2013, and claims priority to German Patent Application No. 10 2012 111 118.9 filed Nov. 19, 2012, the disclosures of which are hereby incorporated in their entirety by reference.

BACKGROUND OF THE INVENTION

Field of the Invention

The invention relates to a method for laser welding of one or more workpieces made from press hardenable steel, particularly manganese-boron steel, in a butt joint, in which the workpiece or the workpieces have a thickness of at least 1.8 mm and/or a jump in thickness of at least 0.4 mm arises at the butt joint, and in which the laser welding takes place with the supply of filler wire into the molten bath generated with a laser beam.

Description of Related Art

Tailored blanks made from sheet steel are used in the automotive industry to fulfil high demands on the crash safety with the smallest possible bodywork weight. For this purpose, individual blanks or strips of different material quality and/or sheet thickness are joined together by laser welding in a butt joint. In this manner, various points of the finished bodywork component can be adapted to different loads. Thus, at locations with high loading, thicker or higher strength sheet steel can be used and thinner steel or else sheets made from relatively weak deep-drawing grades can be used in the remaining locations. Additional reinforcing parts on the bodywork become superfluous due to such tailored sheet blanks. This saves material and enables the reduction of the total weight of the bodywork.

In recent years, boron-alloyed steels, particularly manganese-boron steels have been developed, which achieve high strengths, for example tensile strengths in the range of 1500 to 2000 MPa when hot formed with rapid cooling. In the initial state, manganese-boron steels typically have a ferritic/pearlitic structure and have strengths of approx. 600 MPa. By press hardening, i.e. by heating to austenising temperature and subsequent rapid cooling in the compression mould, a martensitic structure can be set however, so that the thus-treated steels can achieve tensile strengths in the range from 1500 to 2000 MPa.

The bodywork components, for example B pillars, produced from such tailored steel blanks have a flawless hardness profile up to a certain sheet thickness or a certain thickness jump. However, it was determined that at a sheet thickness larger than or equal to approx. 1.8 mm, particularly larger than or equal to approx. 2.0 mm, or a thickness jump greater than or equal to approx. 0.4 mm, the problem occurs that the laser weld seam does not harden sufficiently during hot forming (press hardening). Then, a martensitic structure only results to a certain extent in the weld seam, so that during the loading of the finished component, a failure may occur in the weld seam. This problem is presumably associated with the fact that, particularly in the case of a thickness jump, sufficient contact to the cooled forming tool or cooling tool cannot generally be ensured and as a result, the weld seam cannot be completely converted into martensite.

A laser-arc hybrid welding method is described in US 2008/0011720 A1, in which method blanks made from manganese-boron steel, which have an aluminium-containing surface layer, are connected to one another in a butt joint, the laser beam being combined with at least one electric arc, in order to melt the metal at the butt joint and to weld the blanks to one another. The electric arc is in this case output by means of a tungsten welding electrode or is formed at the tip of a filler wire if a MIG welding torch is used. The filler wire can contain elements (e.g. Mn, Ni and Cu), which induce the transformation of the steel into an austenitic structure and benefit maintenance of the austenitic transformation in the molten bath.

Using this known laser arc hybrid welding method, it should be achieved that hot formable blanks made from manganese boron steel, which are provided with a coating with an aluminium/silicon basis, can be welded without preceding removal of the coating material in the region of the weld seam to be produced, wherein it should nonetheless be ensured however that aluminium located at the abutting edges of the blanks does not lead to a lowering of the tensile strength of the component in the weld seam. By providing an electric arc behind the laser beam, the molten bath should be homogenised and as a result, local aluminium concentrations larger than 1.2% by weight, which create a ferritic structure, are eliminated.

This known hybrid welding method is relatively expensive with regards to the energy consumption, owing to the generation of the electric arc.

SUMMARY OF THE INVENTION

The present invention is based on the object of specifying a laser welding method, by which workpieces made from pressure-hardenable steel, particularly manganese-boron steel, which have a thickness of at least 1.8 mm and/or in which a jump in thickness of at least 0.4 mm results at the butt joint, can be joined to tailored workpieces, particularly tailored blanks, in the butt joint, the weld seam of which can be hardened reliably during hot forming (press hardening) to a martensitic structure. In addition, the method should stand out owing to a high productivity and a relatively low energy consumption.

The method according to the invention is used for laser welding of one or a plurality of workpieces of press hardenable steel, particularly manganese-boron steel, in a butt joint, in which the workpiece or the workpieces have a thickness of at least 1.8 mm, particularly at least 2.0 mm, and/or a jump in thickness of at least 0.4 mm arises at the butt joint. The laser welding in this case takes place with the supply of filler wire into the molten bath generated using a laser beam. The method according to the invention is furthermore characterised in that the filler wire contains at least one alloy element from the group comprising manganese, chromium, molybdenum, silicon and/or nickel, which element promotes the formation of austenite in the molten bath generated using the laser beam, wherein this at least one alloy element is present in the filler wire with a mass proportion that is larger by 0.1% by weight than in the press hardenable steel of the workpiece or the workpieces.

The workpieces produced according to the invention or tailored blanks offer a larger process window with regards to the hot forming (press hardening), in which window a satisfactory hardening of the component is achieved, particularly in the weld seam thereof also.

The method according to the invention cannot only be used when joining together a plurality of steel blanks of different material quality and/or sheet thickness in the butt joint, but rather also in the case of laser welding an individual plate- or strip-shaped steel sheet, wherein in the last-mentioned case, the edges of the workpiece that are to be welded to one another are moved towards each other by reshaping, for example by bending or roll forming, so that they are finally arranged facing one another in the butt joint.

In a preferred embodiment of the method according to the invention, the workpiece or the workpieces are selected such that the steel thereof has the following composition: 0.10 to 0.50% by weight C, max. 0.40% by weight Si, 0.50 to 2.00% by weight Mn, max. 0.025% by weight P, max. 0.010% by weight S, max. 0.60% by weight Cr, max. 0.50% by weight Mo, max. 0.050% by weight Ti, 0.0008 to 0.0070% by weight B, and min. 0.010% by weight Al, remainder Fe and unavoidable impurities. The components produced from such a steel have a relatively high tensile strength after press hardening.

Particularly preferably, in the method according to the invention, blank- or strip-shaped workpieces made from press hardenable steel are used, which have a tensile strength in the region of 1500 to 2000 MPa after the press hardening.

A further preferred embodiment of the method according to the invention is characterised in that the filler wire used therein has the following composition: 0.05 to 0.15% by weight C, 0.5 to 2.0% by weight Si, 1.0 to 2.5% by weight Mn, 0.5 to 2.0% by weight Cr+Mo, and 1.0 to 4.0% by weight Ni, remainder Fe and unavoidable impurities. Experiments have shown that with such a filler wire, with the use of the method according to the invention, a complete conversion of the weld seam into a martensitic structure can be assured in a particularly reliable manner during subsequent press hardening.

According to a further preferred embodiment of the method according to the invention, the filler wire used therein has a carbon mass proportion that is lower by at least 0.1% by weight than the press hardenable steel of the workpiece or the workpieces. An embrittlement of the weld seam can be prevented by a relatively low carbon content of the filler wire. In particular, a good residual elasticity can be achieved at the weld seam due to a relatively low carbon content of the filler wire.

A further advantageous embodiment of the method according to the invention provides that the filler wire can be supplied to the molten bath in a heated state. As a result, a higher process speed or a higher productivity can be achieved. This is because, in this embodiment, not so much energy has to be expended, in order to melt the filler wire. Preferably, the filler wire is heated to a temperature of at least 50° C., at least in a length section, before supply into the molten bath.

In order to prevent an embrittlement of the weld seam, a further preferred embodiment of the method according to the invention provides that the molten bath is loaded with protective gas (inert gas) during the laser welding. In this case, pure argon, helium, nitrogen or a mixture thereof or a mixture made up of argon, helium, nitrogen and/or carbon dioxide and/or oxygen is particularly preferably used.

In order to prevent the formation of a scale layer on steel strips or steel sheets, these are conventionally provided with a coating with an aluminium or aluminium/silicon basis. The method according to the invention can also be applied when using such coated steel blanks or steel strips. Uncoated steel blanks or steel strips can likewise be welded to one another according to the method according to the invention. According to a further advantageous embodiment of the method according to the invention, the coating with an aluminium or aluminium/silicon basis can be removed in the edge region along the abutting edges to be welded to one another before the laser welding. This can take place by means of an energy beam, preferably a laser beam. A mechanical or high-frequency (HF) de-layering is likewise conceivable. In this manner, an impairment of the weld seam by coating material otherwise introduced therein in an undesired manner, which can or would lead to falls in the hardness profile during hot forming (press hardening), can be reliably prevented.

BRIEF DESCRIPTION OF THE DRAWINGS

The invention is explained in more detail below on the basis of a drawing illustrating exemplary embodiments. In the figures.

DETAILED DESCRIPTION OF THE INVENTION

Figure 1:
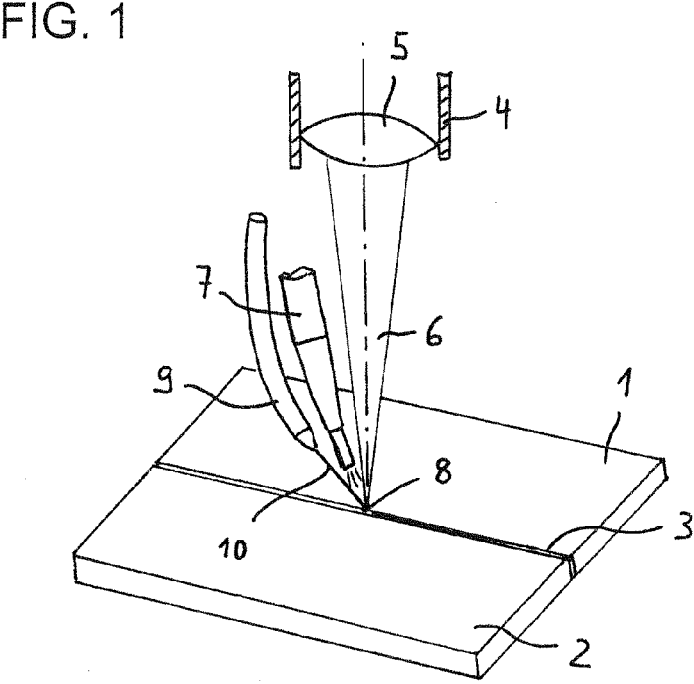
FIG. 1 shows a perspective view of parts of a device for carrying out the laser welding method according to the invention, wherein two essentially equally thick, press hardenable steel blanks are welded to one another in a butt joint.

A device is schematically illustrated in FIG. 1, using which a laser welding method according to the invention can be carried out. The device comprises a support (not shown), on which two strips or blanks 1, 2 made from steel of different material quality abut bluntly along the joint 3. For example, the one workpiece 1 or 2 has a relatively weak deep-drawing grade, whilst the other workpiece 2 or 1 consists of higher strength sheet steel. At least one of the workpieces 1, 2 is produced from press hardenable steel, for example made from manganese-boron steel.

The workpieces 1, 2 are essentially of equal thickness. The thickness thereof is at least 1.8 mm, for example at least 2.0 mm.

Sketched above the workpieces 1, 2 is a section of a laser welding head 4, which is provided with an optical system (not shown) for supplying a laser beam and also a focussing lens 5 for the laser beam 6. Furthermore, a pipe 7 for supplying protective gas is arranged on the laser welding head 4. The aperture of the protective gas pipe 7 is essentially directed onto the focus area of the laser beam 6 or the molten bath 8 generated with the laser beam 6. Pure argon or for example a mixture of argon, helium and/or carbon dioxide is preferably used as protective gas. In addition, a wire feed apparatus 9 is assigned to the laser welding head 4, by means of which, a special additional material is fed to the molten bath 8 in the form of a wire 10, which is likewise melted by the laser beam 6. The additional wire (filler wire) 10 is fed to the molten bath 8 in a heated state. To this end, the wire feed apparatus 9 is equipped with at least one heating element (not shown), for example a heating coil surrounding the wire 10. Using the heating element, the filler wire 10 is preferably heated to a temperature of at least 50° C., particularly preferably to at least 90° C.

Figure 2:
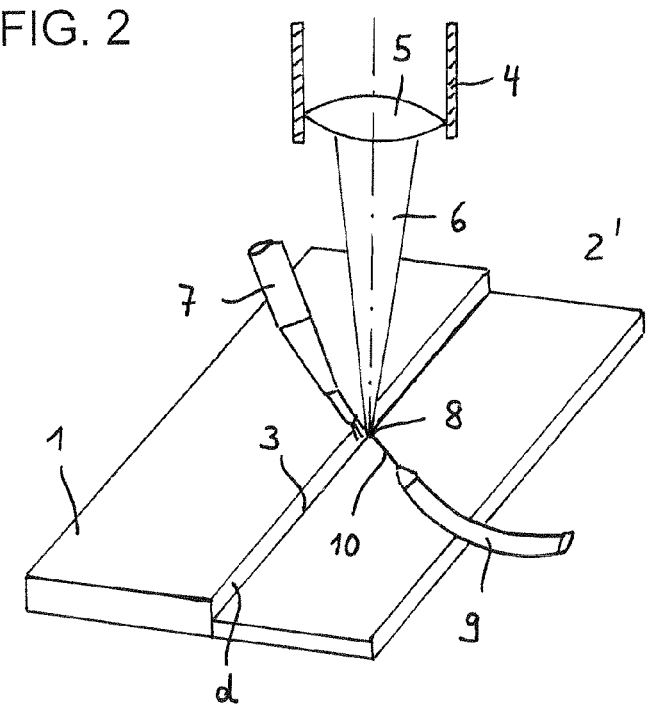
FIG. 2 shows a perspective view of parts of a device for carrying out the laser welding method according to the invention, wherein here two differently thick, press hardenable steel blanks are welded to one another in a butt joint.

The exemplary embodiment illustrated in FIG. 2 differs from the exemplary embodiment according to FIG. 1 in that the workpieces 1, 2' are of different thickness, so that at the butt joint 3, a jump in thickness d of at least 0.4 mm is present. For example, the one workpiece 2' has a sheet thickness in the range from 0.5 mm to 1.2 mm, whilst the other workpiece 1 has a sheet thickness in the range from 1.6 mm to 2.5 mm. Furthermore, the workpieces 1, 2' to be connected to one another in the butt joint 3 can also differ from one another in terms of the material quality thereof. For example, the thicker blank 1 is produced from higher strength sheet steel, whereas the thinner steel blank 2' has a relatively weak deep-drawing quality.

The press hardenable steel, from which at least one of the workpieces 1, 2 or 2' to be connected to one another in the butt joint 3, can for example have the following chemical composition:

max. 0.45% by weight C,
max. 0.40% by weight Si,
max. 2.0% by weight Mn,
max. 0.025% by weight P,
max. 0.010% by weight S,
max. 0.8% by weight Cr+Mo,
max. 0.05% by weight Ti,
max. 0.0050% by weight B, and
min 0.010% by weight Al,
remainder Fe and unavoidable impurities.

The workpieces or steel blanks 1, 2 or 2' can be uncoated or provided with a coating, particularly an Al—Si layer. In the delivery state, i.e. before a heat treatment and rapid cooling, the yield point Re of the press hardenable steel blanks 1, 2 and/or 2' is preferably at least 300 MPa; the tensile strength Rm thereof is at least 480 MPa, and the elongation at break $A_{80}$ thereof is at least 10%. After the hot forming (press hardening), i.e. austenisation at approx. 900 to 920° C. and subsequent rapid cooling, these steel blanks have a yield point Re of approx. 1,100 MPa, a tensile strength Rm of approx. 1500 to 2000 MPa and an elongation at break $A_{80}$ of approx. 5.0%.

Insofar as the workpieces or steel blanks 1, 2 and/or 2' are provided with an aluminium coating, particularly with an Al—Si coating, the coating can be removed or partly de-layered in the edge region along the abutting edges to be welded to one another, before the laser welding. If appropriate, aluminium coating material adhering at the abutting or intersection edges 3 is also removed. The removal (elimination) of the aluminium coating material can preferably take place by means of at least one laser beam.

The filler wire 10 used typically has the following chemical composition:

0.1% by weight C,
0.8% by weight Si,
1.8% by weight Mn,
0.35% by weight Cr,
0.6% by weight Mo, and
2.25% by weight Ni,
remainder Fe and unavoidable impurities.

The manganese content of the filler wire 10 is in this case constantly higher than the manganese content of the press hardenable workpieces 1, 2 or 2'. Preferably, the manganese content of the filler wire 10 is in this case higher by approx. 0.2% by weight than the manganese content of the press hardenable workpieces 1, 2 or 2'. Furthermore, it is beneficial, if also the chromium and molybdenum content of the filler wire 10 is higher than in the press hardenable workpieces 1, 2 or 2'. Preferably, the combined chromium-molybdenum content of the filler wire 10 is in this case higher by approx. 0.2% by weight than the combined chromium-molybdenum content of the press hardenable workpieces 1, 2 or 2'. The nickel content of the filler wire 10 preferably lies in the range of 1 to 4% by weight. Additionally, the filler wire 10 preferably has a lower carbon content than the press hardenable steel of the workpieces 1, 2 or 2'.

The invention claimed is:

1. A method for laser welding of one or more workpieces made from press hardenable steel in a butt joint, in which the workpiece or the workpieces have a thickness of at least 1.8 mm and/or a jump in thickness of at least 0.4 mm arises at the butt joint, comprising supplying filler wire into a molten bath generated exclusively by a laser beam, wherein the filler wire contains at least one alloy element from the group consisting of manganese, chromium, molybdenum, silicon and nickel, the element promoting the formation of austenite in the molten bath generated using the laser beam, wherein the at least one alloy element is present in the filler wire with a mass proportion that is larger by 0.1% by weight than a mass proportion of the element in the press hardenable steel of the workpiece or the workpieces, wherein the filler wire has a carbon mass proportion that is lower by at least 0.1% by weight than the mass proportion of carbon in the press hardenable steel of the workpiece or the workpieces, and wherein the workpiece used or the workpieces used are uncoated or, by removing in the edge region along the abutting edges to be welded to one another before the laser welding, are partly de-layered.

2. The method according to claim 1, wherein the steel of the workpiece or the workpieces has the following composition:

0.10-0.50% by weight C,
max. 0.40% by weight Si,
0.50-2.00% by weight Mn,
max. 0.025% by weight P,
max. 0.010% by weight S,
max. 0.60% by weight Cr,
max. 0.50% by weight Mo,
max. 0.050% by weight Ti,
max. 0.0008-0.0070% by weight B, and
min. 0.010% by weight Al,
remainder Fe and unavoidable impurities.

3. The method according to claim 1, wherein the filler wire has the following composition:

0.05-0.15% by weight C,
0.5-2.0% by weight Si,
1.0-2.5% by weight Mn,
0.5-2.0% by weight Cr+Mo, and
1.0-4.0% by weight Ni,
remainder Fe and unavoidable impurities.

4. The method according to claim 1, herein the filler wire is supplied to the molten bath in a heated state.

5. The method according to claim 4, wherein the filler wire is heated to a temperature of at least 50° C., at least in a length section, before supply into the molten bath.

6. The method according to claim 1, wherein the molten bath is loaded with protective gas during the laser welding.

7. The method according to claim 6, wherein pure argon or a mixture of argon and carbon dioxide is used as the protective gas.

8. The method according to claim 1, wherein the partly de-layered workpiece or the partly de-layered workpieces have a surface layer comprising aluminium or aluminium/silicon.

9. The method according to claim 1, wherein the press hardenable steel is a manganese-boron steel.

* * * * *